United States Patent
Garcia et al.

(10) Patent No.: US 10,118,497 B2
(45) Date of Patent: Nov. 6, 2018

(54) RECEIVING DEVICE FOR RECEIVING A MAGNETIC FIELD AND FOR PRODUCING ELECTRIC ENERGY BY MAGNETIC INDUCTION, FOR USE BY A VEHICLE

(71) Applicant: Bombardier Primove GmbH, Berlin (DE)

(72) Inventors: Federico Garcia, Mannheim (DE); Nestor Martinez Pelaez, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 65 days.

(21) Appl. No.: 15/506,410

(22) PCT Filed: Aug. 26, 2015

(86) PCT No.: PCT/EP2015/069526
§ 371 (c)(1),
(2) Date: Feb. 24, 2017

(87) PCT Pub. No.: WO2016/030413
PCT Pub. Date: Mar. 3, 2016

(65) Prior Publication Data
US 2017/0253129 A1    Sep. 7, 2017

(30) Foreign Application Priority Data
Aug. 26, 2014 (GB) .................................. 1415056.9

(51) Int. Cl.
*B60L 11/18* (2006.01)
*H01F 27/08* (2006.01)
(Continued)

(52) U.S. Cl.
CPC ............ *B60L 11/182* (2013.01); *H01F 27/08* (2013.01); *H01F 27/10* (2013.01); *H01F 27/28* (2013.01);
(Continued)

(58) Field of Classification Search
None
See application file for complete search history.

(56) References Cited

U.S. PATENT DOCUMENTS 5,594,317 A    1/1997  Yeow et al.
9,476,736 B2   10/2016 Arisawa
(Continued)

FOREIGN PATENT DOCUMENTS

CN    101261137 A    9/2008
CN    103368277 A    10/2013
(Continued)

*Primary Examiner* — Jared Fureman
*Assistant Examiner* — Aqeel Bukhari
(74) *Attorney, Agent, or Firm* — The Webb Law Firm

(57) ABSTRACT

A receiving device for receiving a magnetic field and for producing electric energy by magnetic induction, wherein the receiving device includes at least one coil of at least one electric line and wherein the magnetic field induces an electric voltage in the at least one coil during operation. The receiving device and the at least one coil are adapted to receive the magnetic field from a receiving side of the receiving device. The receiving device includes a first field shaping arrangement having magnetizable material adapted to shape magnetic field lines of the magnetic field. The receiving device includes a capacitor arrangement electrically connected to the at least one coil. The receiving device includes a first cooling structure having conduits for guiding a flow of a cooling fluid to cool the receiving device and is placed in between the first field shaping arrangement and the capacitor arrangement.

19 Claims, 10 Drawing Sheets

(51) Int. Cl.
  *H02J 50/12* (2016.01)
  *H01F 27/28* (2006.01)
  *H02J 50/00* (2016.01)
  *H01F 27/10* (2006.01)
  *H01F 38/14* (2006.01)

(52) U.S. Cl.
  CPC ......... *H01F 27/2876* (2013.01); *H01F 38/14* (2013.01); *H02J 50/12* (2016.02); *B60L 2240/36* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2004/0129578 A1* | 7/2004 | McLachlan | C02F 1/48 205/742 |
| 2008/0231263 A1 | 9/2008 | Rebmann | |
| 2010/0097168 A1 | 4/2010 | Hahn et al. | |
| 2013/0249477 A1 | 9/2013 | Keeling et al. | |
| 2013/0264887 A1 | 10/2013 | Arisawa | |
| 2014/0084697 A1 | 3/2014 | Yasuda et al. | |
| 2015/0075934 A1 | 3/2015 | Czainski et al. | |
| 2015/0300534 A1 | 10/2015 | Leininger et al. | |
| 2016/0005531 A1* | 1/2016 | Sullivan | H01F 17/0013 307/104 |
| 2016/0072304 A1 | 3/2016 | Anders et al. | |

FOREIGN PATENT DOCUMENTS

| | | |
|---|---|---|
| EP | 0651404 A1 | 5/1995 |
| EP | 0715390 A1 | 6/1996 |
| EP | 2667390 A1 | 11/2013 |
| GB | 2501482 A | 10/2013 |
| GB | 2507741 A | 5/2014 |
| GB | 2512862 A | 10/2014 |
| JP | 2010268660 A | 11/2010 |

\* cited by examiner

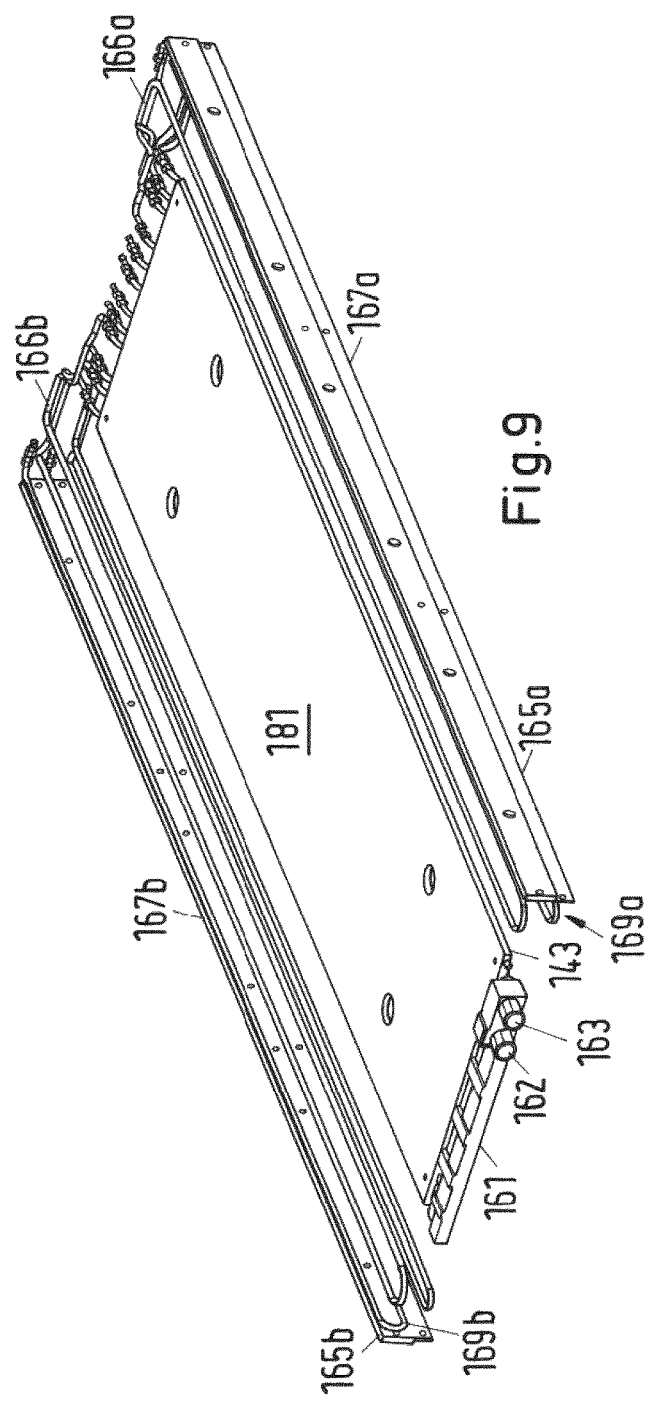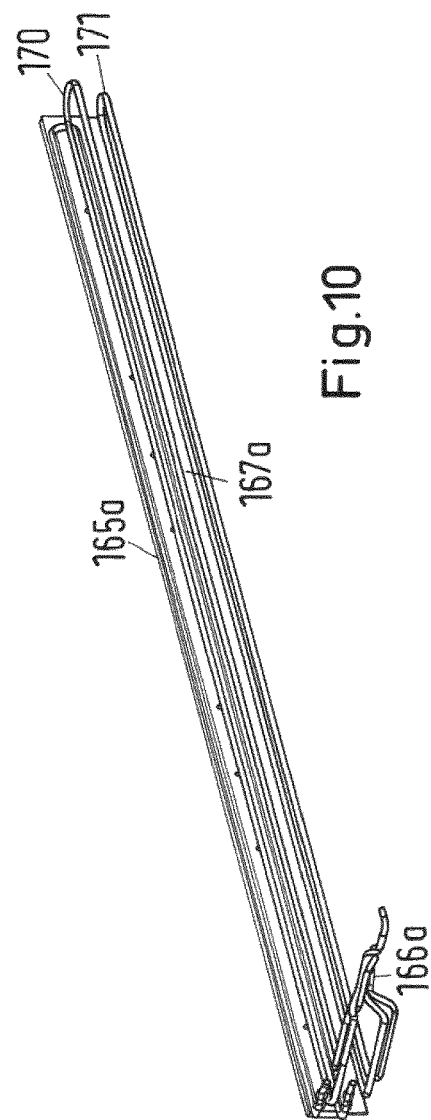

RECEIVING DEVICE FOR RECEIVING A MAGNETIC FIELD AND FOR PRODUCING ELECTRIC ENERGY BY MAGNETIC INDUCTION, FOR USE BY A VEHICLE

CROSS-REFERENCE TO RELATED APPLICATIONS

This application is the United States national phase of International Application No. PCT/EP2015/069526 filed Aug. 26, 2015, and claims priority to United Kingdom Patent Application No. 1415056.9 filed Aug. 26, 2014, the disclosures of which are hereby incorporated in their entirety by reference.

BACKGROUND OF THE INVENTION

Field of the Invention

The invention relates to a receiving device for receiving a magnetic field and for producing electric energy by magnetic induction, in particular for use but not limited to the use by a vehicle. The invention also relates to a method of manufacturing such a receiving device and to a method of operating such a receiving device. The invention can be applied in the field of wireless transfer of energy, in particular to vehicles, such as road automobiles, busses and rail vehicles. In particular, the receiving device can be adapted to produce electric power at least at rates in the kilowatt range, e.g. 20 kW.

Description of Related Art

GB 2501482 A describes an arrangement for providing a land vehicle, in particular a rail vehicle or a road automobile, with electric energy by producing an electromagnetic field on a primary side located on the track of the vehicle and/or located at a stop of the vehicle, by receiving the electromagnetic field on a secondary side onboard the vehicle above the source of the electromagnetic field and by magnetic induction on the secondary side. A secondary side conductor assembly is made of electrically conducting material which produces an electromagnetic stray field during operation while the electrically conducting material carries an alternating electric current. A secondary side shielding assembly made of magnetizable material shields regions, which are located beyond the magnetizable material, from the electromagnetic stray field.

As described in GB 2501482 A, the secondary side conductor assembly and the secondary side shielding assembly may be parts of the same receiving device for receiving the magnetic field from the primary side. For example, the present invention may relate to a receiving device as disclosed by GB 2501482 A, which also comprises a capacitor arrangement comprising at least one capacitor, which is electrically connected to the conductor assembly.

In an inductive power transfer (IPT) system, the transfer of electric power is performed using two sets of windings of electric conductors, e.g. three-phase windings. A first set is installed on the primary side (e.g. on the ground) and can be fed by a wayside power converter. The second set of windings (comprising at least one coil of an electric line) is installed on the secondary side, such as on the vehicle. For example, the second set of windings can be attached underneath the vehicle. The device comprising the second set of windings is often referred to as pickup or receiver. In particular, the first set of windings and the second set of windings form a medium frequency (e.g. in the range of 1 kHz to 200 kHz) transformer to transform electric energy to the secondary side. This can be done in a static state (when there is no motion between the primary and the secondary side) and in a dynamic state (when the secondary side, such as the vehicle, moves).

Due to a clearance or gap, which is comparatively large compared to conventional transformers, between the primary windings and the secondary windings, the operational behaviour of this transformer differs from the behaviour of conventional transformers which have a closed magnetic core with negligible or small air gaps. The large air gap results in smaller mutual inductive coupling and larger leakage inductances.

To be able to transfer energy at high power levels, a capacitor arrangement is used in order to compensate the reactance of the inductors at the operating frequency e.g. in the middle frequency region. The combination of the inductance and the capacitance forms a resonant circuit. A perfect impedance cancellation happens if impedance values of the inductance and the capacitance are chosen such that the resonance frequency of the resonant circuit is equal to the frequency of an alternating electric current through the primary side windings. Such a resonant circuit is tuned.

In short, the purpose of the capacitor arrangement of the secondary side receiver is to form an electric circuit having a resonance frequency which is defined by the capacitance of the capacitor arrangement and by the inductance of the windings.

During operation of the system, significant changes of the receiver's electric properties have been observed. This refers to the electric properties of the electric lines and of the capacitor arrangement, including the inductance of the windings and the capacitance of the capacitor arrangement, as well as the magnetic properties of the magnetizable material. These changes of the electric properties affect the resonance frequency.

SUMMARY OF THE INVENTION

It is an object of the present invention to provide a receiving device for receiving a magnetic field and for producing electric energy by magnetic induction, a method of manufacturing such a receiving device and a method of operating such a receiving device which allow for keeping the electric properties constant.

The invention is based on the findings that the electric lines of the receiver and the capacitor(s) of the capacitor arrangement produce heat. The same applies to the shielding assembly made of magnetizable material of the receiver. The magnetic field reverses the polarization of the magnetizable material with the operating frequency. Especially for the resonant circuits, it is important to keep the operating temperature in a predefined temperature region. Otherwise, the receiver's electric properties and, therefore, the resonance frequency change. This would significantly reduce the efficiency of energy transfer. It is therefore proposed to keep the temperature of the receiving device constant or within a defined temperature region. Another advantage is that the lifetime of the at least one capacitor of the capacitor arrangement is increased due to smaller operating temperatures. In addition, smaller temperature changes in the course of operation increase the lifetime.

In practice, corresponding means for keeping the temperature constant shall be efficient and shall require little space.

According to a basic idea of the present invention, a first cooling structure comprising conduits for guiding a flow of a cooling fluid in order to cool the receiving device is used within the receiving device. The first cooling structure is placed in between a first field shaping arrangement comprising magnetizable material adapted to shape magnetic field lines of the magnetic field and the capacitor arrangement. Thereby, the first cooling structure can be used to cool both the first field shaping arrangement and the capacitor arrangement. In particular, the first cooling structure is in direct mechanical contact with both arrangements so that there is efficient heat transfer to the first cooling structure. In any case, using the first cooling structure for both arrangements reduces the effort required for providing and operating the cooling system and requires little space.

In particular, a receiving device is proposed for receiving a magnetic field and for producing electric energy by magnetic induction, in particular for use by a vehicle, wherein
  the receiving device comprises at least one coil of at least one electric line and wherein the magnetic field induces an electric voltage in the at least one coil during operation in order to transfer energy to the receiving device,
  the receiving device and the at least one coil are adapted to receive the magnetic field from a receiving side of the receiving device,
  the receiving device comprises a first field shaping arrangement comprising magnetizable material adapted to shape magnetic field lines of the magnetic field,
  the first field shaping arrangement is placed behind the at least one coil, if viewed from the receiving side of the receiving device,
  the receiving device comprises a capacitor arrangement comprising at least one capacitor, which is electrically connected to the coil,
  the capacitor arrangement is placed behind the first field shaping arrangement, if viewed from the receiving side of the receiving device,
  the receiving device comprises a first cooling structure comprising conduits for guiding a flow of a cooling fluid in order to cool the receiving device,
  the first cooling structure is placed in between the first field shaping arrangement and the capacitor arrangement.

The present invention also covers a corresponding method of manufacturing the receiving device as well as a corresponding method of operating the receiving device.

Since the capacitor arrangement is placed behind the first field shaping arrangement, the receiving device has a compact, space-saving configuration and the capacitor arrangement is protected from influences of the magnetic field which is received by the receiving device from the primary side of the IPT system.

The first cooling structure preferably comprises a plate of electrically conductive material which contains the conduits for conducting the cooling fluid. In particular, the plate has a width and length measured in the directions transverse to the direction from the plate to the receiving side, wherein the thickness of the plate measured in the direction from the plate to the receiving device is smaller than the width and length. Therefore and since the first cooling structure is placed in between the first field shaping arrangement and the capacitor arrangement, the electrically conducting material shields the area beyond (if viewed from the at least one coil of the receiving device) the first cooling structure from electromagnetic fields. This either increases the shielding effect provided by the first field shaping arrangement or the thickness of the first field shaping arrangement can be reduced.

In particular, the first cooling structure is electrically insulated from any magnetically or electrically conducting parts of the receiving device.

Preferably, the first cooling structure fully covers the first field shaping arrangement. Therefore, cooling efficiency is increased.

If viewed from the receiving side, the first field shaping arrangement is placed behind the at least one coil, since the area opposite to the first field shaping arrangement shall be shielded from the magnetic field. According to a preferred embodiment, the receiving device comprises a further, second cooling structure comprising conduits for guiding a flow of a cooling fluid in order to cool the receiving device, wherein the second cooling structure is placed in between the at least one coil and the first field shaping arrangement. Thereby, cooling efficiency is further increased and the receiving device has a compact configuration, since the second cooling structure is placed in between the at least one coil and the first field shaping arrangement. Preferably, the second cooling structure is in direct mechanical contact with the at least one coil and/or with the first field shaping arrangement. Therefore, efficiency of heat transfer is improved.

In particular, the second cooling structure comprises a plate of electrically non-conductive, non-magnetic and non-magnetizable material which contains the conduits. Therefore, the magnetic shielding properties of the first field shaping arrangement are not affected. This embodiment solves the problem that the magnetic field lines of the magnetic field should not be influenced by a cooling structure in between the at least one coil and the magnetizable material.

In particular, as described in GB 2501482 A, at least one coil may comprise lateral end regions on opposite sides of the at least one coil, wherein the lateral end regions are connected by electric lines of the at least one coil extending in a central region in between the lateral end regions. The lateral end regions are surrounded on at least two sides of the lateral end regions, including a lateral outer side of the lateral end region, by (on each lateral end region) a second field shaping arrangement comprising magnetizable material adapted to shape magnetic field lines of the magnetic field, wherein a third cooling structure comprising conduits for guiding a flow of a cooling fluid in order to cool the receiving device is placed on the lateral outer side of the lateral end region.

It is preferred that the third cooling structure comprises a plate of electrically conductive material which contains the conduits for conducting the cooling fluid. Optionally, it has at least one of the features mentioned above for the first cooling structure. The electrically conducting material shields the area beyond (if viewed from the lateral end region) the third cooling structure from electromagnetic fields. This either increases the shielding effect provided by the second field shaping arrangement or the thickness of the second field shaping arrangement can be reduced.

Preferably, a fourth cooling structure comprising conduits for guiding a flow of a cooling fluid in order to cool the receiving device is placed in each case in between the second field shaping arrangement and the lateral end region of the at least one coil.

In particular, the lateral end regions may be surrounded on three sides by the second field shaping arrangement so that a cross section of the second field shaping arrangement is shaped as a C-profile or U-profile. The three sides are the lateral outer side as well as the sides in front of and behind the lateral end region if viewed from the receiving side. In particular, the fourth cooling structure may surround the lateral end region on the three sides and its cross section may be shaped as a C-profile or U-profile, corresponding to the shape of the second field shaping arrangement. Optionally, the second field shaping arrangement may be enclosed by heat conducting material (in particular made of metal, such as aluminum) having a cross section shape of a C-profile or U-profile, corresponding to the shape of the second field shaping arrangement. Such a heat conducting material improves the heat transfer, not only to the third cooling structure, but also to the surrounding area and/or to a housing of the receiver. Metal or another electrically conducting material also improves the shielding of the exterior from the electromagnetic field of the IPT system.

In particular, the fourth cooling structure comprises a plate of electrically non-conductive, non-magnetic and non-magnetizable material which contains the conduits. Therefore, the magnetic shielding properties of the second field shaping arrangement are not affected. Again, the magnetic field lines of the magnetic field are not influenced by the cooling structure in between the electric lines of the at least one coil and the magnetizable material.

Long conduits for conducting the cooling fluid may cause a significant cooling fluid pressure drop and may require correspondingly high power for pumping the cooling fluid through the conduits. Furthermore, the flow of the cooling fluid nearby the cooling fluid inlet may be turbulent while, due to the pressure drop, the flow of the cooling fluid, nearby the cooling fluid outlet may be laminar. Consequently, the heat transfer into the cooling fluid would significantly differ.

To overcome these problems, it is proposed to connect at least one of the cooling structures mentioned above to a fluid inlet which branches off into a plurality of conduits in the cooling structure and to connect the cooling structure to a fluid outlet which reunites the flow of cooling fluid within the plurality of conduits. These branching and reuniting conduit regions may be located within the cooling structure and/or outside of the cooling structure. As a result, the total cross sectional area for the flow of cooling fluid is increased. Despite the large cross sectional area, the cooling fluid flow is preferably turbulent within the conduits in the cooling structure. For example, the diameter of individual conduits having circular cross-sectional areas may be the same for all conduits within the same cooling structure and may be in the range from 5 to 7 mm, in particular 6 mm. In addition or alternatively, there may be four to eight conduits, in particular six conduits, which branch off from the same fluid inlet and which are reunited by the fluid outlet. The cross sectional area of a fluid inlet tube common to and branching off into the plurality of conduits in the cooling structure may be in the range from 16 to 24 mm, in particular 20 mm. Therefore, and not restricted to this specific example, the cross sectional area may be reduced by branching off the plurality of conduits and the flow may become turbulent.

In practice, the at least one cooling structure of the receiving device may be combined with a heat exchanger external to the receiving device, so that cooling fluid circulates through the at least one cooling structure and the heat exchanger, which are connected by at least one forward conduit and one return conduit, and so that heat of the cooling fluid returning to the heat exchanger through the return conduit is transferred via the heat exchanger, in particular transferred to the ambient air.

In particular, the plurality of conduits can be considered as hydraulically parallel conduits, even if the conduits are not mechanically arranged in parallel to each other. According to a preferred embodiment, the cross sections of the hydraulically parallel conduits are equal in shape and size so that the cross sectional area of a single conduit times the number of hydraulically parallel conduits is equal to the total cross sectional area available for conducting cooling fluid through the cooling structure. In this manner, each conduit can contribute to fluid flow and heat transport in the same manner.

Receivers may have regions with temperatures higher than other regions. These regions may be called hotspots. Examples are the regions of individual capacitors of the capacitor arrangement. Another example is a region having a larger number of electric lines of the at least one coil than other regions, since electric currents through the lines produce heat losses due to the ohmic resistance. On the other hand, the capability of the cooling fluid to absorb heat generally decreases from inlet to outlet of the cooling structure, since the temperature of the cooling fluid generally increases from inlet to outlet. This means that the heat transfer from hotspots to the cooling fluid nearby the outlet is generally less efficient than from hotspots nearby the inlet.

Therefore, it is proposed that at least one conduit of at least one of the cooling structures comprises a forward section for guiding incoming cooling fluid from a fluid inlet and a return section for guiding cooling fluid from the forward section to a fluid outlet, wherein the forward section and the return section extend side-by-side to each other and are mechanically connected to each other by a supporting material of the first cooling structure for supporting the at least one conduit. Since the forward section and the return section are connected to each other by the supporting material, they extend side-by-side, but at a distance to each other. In particular, the longitudinal axes of the forward section and the return section are parallel to each other. The supporting material is preferably a material having a high coefficient of heat conductivity, for example metal and in particular aluminum. These or other materials having a high heat conductivity coefficient are not only preferred in the context of this embodiment, but generally if the material may be an electrically conductive material.

Placing the forward section and the return section side-by-side allows for heat transfer from the warmer fluid closer to the fluid outlet to the cooler fluid closer to the fluid inlet. Therefore, the embodiment tends to equalize the cooling fluid temperature and heat transfer from hotspots located closer to the fluid outlet is improved. In the region of hotspots heat can be transferred to the cooling fluid within the forward section as well as within in other regions heat can be transferred from the return section to the forward section. As a result, the use of the total heat capacity of the cooling structure, including the heat capacity of the cooling fluid, and the use of the heat transport capability of the cooling fluid is improved.

In particular, there may be one return section within the cooling structure for each forward section and the return section is located next to the forward section of the same conduit, i.e. they are connected by material supporting the conduit and there is no other forward or return section in between.

Preferably, the cooling fluid is a liquid, such as oil, or may contain water, optionally mixed with anti-freezing agent. It is preferred that a liquid is used which is dielectric and, therefore, does not interfere with the magnetic field, in particular a magnetic field having a frequency in the kHz range.

The magnetizable material may be iron or preferably a ferrite. The magnetizable material redirects field lines of the magnetic field which intrude into the material. It may be ferromagnetic material and/or ferrimagnetic material (such as a ferrite). Ferrites typically used in practice have the advantage that they have a high heat conduction coefficient. However, it is preferred that any gaps between neighboring ferrite elements and/or between ferrite material and the cooling structure are filled by a filler material, such as a heat conducting paste.

The plate material of the cooling structure(s) behind the magnetizable material (if viewed from the at least one coil) may be a metal, in particular aluminum or a metal alloy. The conduits may be tubes made of the same or another metal, in particular copper.

The electrically non-conductive, non-magnetic and non-magnetizable plate material of the corresponding cooling structure(s) is preferably a ceramic material, for example a ceramic material consisting of or comprising an aluminum oxide. Alternatively, it may be any plastic material having a sufficiently small electrical conductivity. The conduits may be tubes made of PTFE (polytetrafluoroethylene) or made of other plastic, such as polyvinylchloride.

Many electrically non-conductive, and non-magnetic materials which can be used for a cooling structure having these properties, are poor heat conductors compared to metals, which are electrically conductive. Therefore, it is preferred to use/have at least one cooling structure made of electrically non-conductive and non-magnetic material in a region between a coil and a field shaping arrangement and to use/have at least one further cooling structure made of electrically conductive material having a higher heat conductivity than the material of the electrically non-conductive cooling structure in a region beyond a field shaping arrangement, if viewed from the coil. In particular, the same cooling fluid may consecutively flow through conduits within the electrically non-conductive and within the electrically conductive cooling structure. The cooling provided by the electrically non-conductive cooling structure may not be as effective as the cooling provided by the electrically conductive cooling structure, but it removes heat from a central region of the receiving device. On the other hand, the cooling provided by the electrically conductive structure will effectively cool the receiving device, although not directly in contact with the at least one coil.

Furthermore, it is preferred that the receiver comprises a housing made of heat conducting material, such as metal, in particular aluminum, so that heat transfer through the housing and by natural convection to the surrounding is improved. In particular, at least one structure and/or arrangement of the receiver, for example, the capacitor arrangement, a holding structure for holding electric lines of the at least one coil, the third cooling structure and/or magnetizable material (such a ferrite) of the second field shaping arrangement may be in contact with the inside of the housing. This improves heat transfer to the housing.

In addition or alternatively to a housing, there may be a further cooling structure comprising at least one conduit for guiding cooling fluid behind the capacitor arrangement, if viewed from the at least one coil or from the first field shaping arrangement. The same may apply to the area which is located on the receiving side, i.e. during the operation of the IPT system between the at least one coil and the primary side of the IPT system. Alternatively, this or these further cooling structure(s) may not comprise conduits. In particular, it is preferred that the capacitor arrangement is sandwiched in between two cooling structures having or not having conduits. One of the cooling structures of the sandwich is placed in between the capacitor arrangement and the first field shaping arrangement. Another one of the cooling structures of the sandwich is placed in between the capacitor arrangement and the side of the receiving device which is opposite to the receiving side. In particular, the cooling structures on the opposite sides of the capacitor arrangement, which form the sandwich together with the capacitor arrangement, each may have the shape of a plate. In particular, the capacitors of the capacitor arrangement may be electrically insulated against the cooling structures, at least one of which may be an electrically conductive cooling structure. It is further preferred that the capacitor arrangement is in material contact with each of the cooling structures on its opposite sides. For example, electrically insulating, but thermally conductive material (e.g. pads) may be provided in between the capacitors of the capacitor arrangement and the cooling structures for this purpose.

One way of manufacturing a cooling structure for the receiver is to provide a plate of heat conducting material with grooves and to insert the conduits into the grooves, preferably by inserting a single conduit in each groove. The conduits may be embedded in a filler material filling gaps in between the conduit and the groove surface. The filler may be a paste or an adhesive, such as a two-compound adhesive and/or a thermally activated adhesive. The conduits within the cooling structure may have a generally circular cross-section. Optionally, the conduit wall can be flattened (so that the round shape of the conduit wall becomes straighter) at the surface of the cooling structure. In this case, the surface of the cooling structure may be formed locally by the flattened conduit wall, which may be formed by the filler material otherwise.

The receiver may be part of a vehicle as mentioned above. Furthermore, the system comprising the primary side arrangement for producing the magnetic field which is received by the receiver and further comprising the receiver can be improved by cooling the receiver efficiently. Therefore, aspects of the invention relate to a vehicle comprising the receiver and relate to the system.

At least one of the cooling structures of the receiving device is preferably used to warm up the receiving device during an initial phase of operating the receiving device. The initial phase may be a phase before and/or at the beginning of the production of electric energy by magnetic induction. In particular, the first cooling structure is used to warm up the first field shaping arrangement and the capacitor arrangement during an initial phase of operating the receiving device. Thereby, the cooling structure not only cools the receiving device, but also provides for elevated operating temperatures in the initial phase of operation. This embodiment is based on the findings that the electric properties, and therefore the resonance frequency, may differ from the normal operating state, even if the temperature is too small.

The cooling fluid through the at least one cooling structure is preferably pumped. Therefore, the flow through the conduits is forced by operating at least one pump. There may be an individual pump for each cooling structure. Alternatively, the same pump may pump cooling fluid through a plurality of the cooling structures of the same receiver.

Preferably, the pump or at least one of the pumps is controlled by a controller and the cooling fluid pressure or pressure increase generated by the pump can be adjusted and amended by the controller. Furthermore, it is preferred that the receiving device comprises at least one temperature sensor attached to an arrangement or device which is cooled by a cooling structure or the cooling structure which is associated with the pump. In particular, the at least one temperature sensor can be attached to a hotspot. During operation of the receiving device, the controller controls the pump so that the fluid pressure or pressure increase generated by the pump is increased if the temperature measured by the temperature sensor increases or (according to further embodiment) if the temperature rises up to a predetermined threshold value or (according to another embodiment) if the temperature rises above a predetermined threshold value. In particular, one temperature sensor may be attached to the capacitor arrangement. One temperature sensor or another temperature sensor may be attached to a region of the coil arrangement with more electric lines (in particular with a higher density of electric lines) than in other regions of the coil arrangement.

If the temperature measured by the at least one temperature sensor decreases or is below (or not above) a predetermined threshold value, the fluid pressure or pressure increase generated by the pump is preferably reduced or is in a lower region of a range of possible fluid pressures or pressure increases.

In particular during an initial phase of operating the receiving device, an external heating device (such as an electrical heating) can be in contact with a forward conduit conducting the cooling fluid into the at least one cooling structure. The control may control the pump so that the fluid pressure or pressure increase is adapted and the heat which is transported into the receiving device is controlled. For example, the heat power may be controlled to be smaller at the beginning of the initial phase compared to the end of the initial phase.

BRIEF DESCRIPTION OF THE DRAWINGS

Examples of the invention will be described with reference to the attached drawing. The figures of the drawing show.

DETAILED DESCRIPTON OF THE INVENTION

Figure 1:
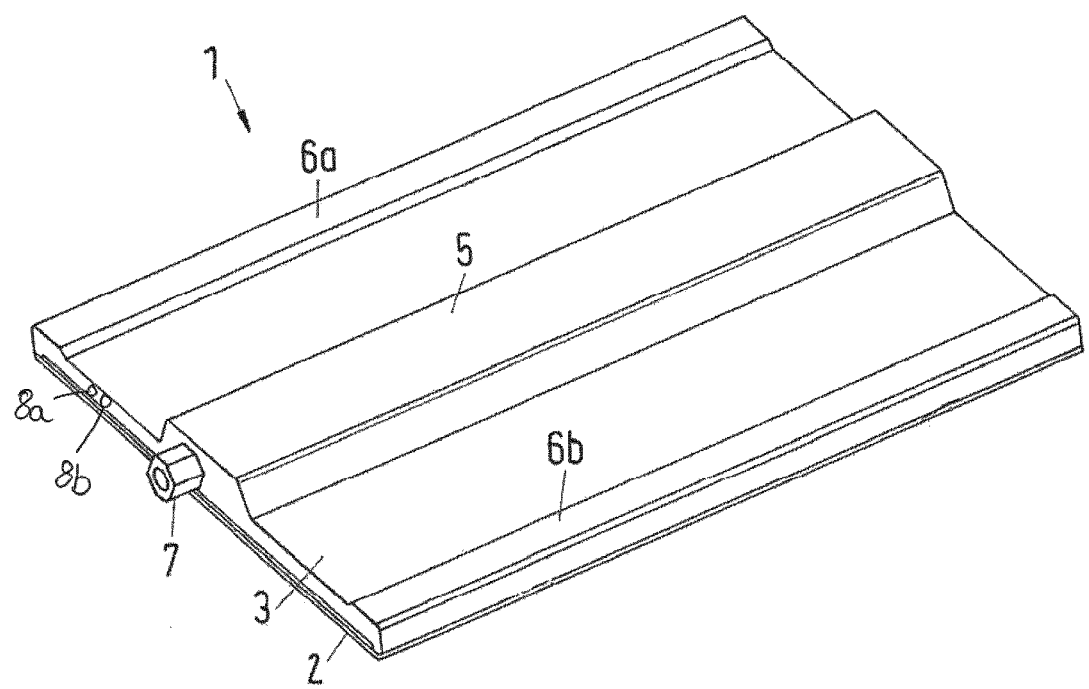
FIG. 1 a three dimensional view of an example of a housing (i.e. a case) of a receiving device, FIG. 2 a view of a side face of the case shown in FIG. 1, FIG. 3 an exploded view of the receiving device with the housing shown in FIG. 1 and FIG. 2 showing interior components of the receiving device, according to a specific embodiment, i.e. the interior components may be varied, FIG. 4 an example of an arrangement of coils, in particular the arrangement shown in FIG. 3, FIG. 5 a particular example of a base part of the receiver in FIG. 3 with a specific embodiment of an arrangement of components for positioning and/or fixing interior components of the receiving device, FIG. 5 schematically a cooling structure comprising conduits for guiding a flow of a cooling fluid in order to cool the receiving device, which may be the first or second cooling structure of the receiving device, FIG. 6 an arrangement of capacitors and connecting lines in an exploded view, FIG. 7 schematically a cross section of a cooling structure having a plate shaped carrier material with grooves in which conduits are embedded, FIG. 8 schematically a top view for illustrating heat transfer from cooling fluid within a return section to cooling fluid in a forward section of a conduit as well. As for illustrating heat transfer from a hotspot to the cooling fluid, FIG. 9 a first cooling structure which is to be placed between magnetizable material and a capacitor arrangement, wherein forward sections and return sections of conduits within the first cooling structure are connected to forward sections and return sections of a third cooling structure to be placed next to a lateral end regions of the at least one coil of the receiving device, FIG. 10 connecting conduits and one element of the third cooling structure shown in FIG. 9, FIG. 11 a schematic cross section of a further embodiment of a receiving device having first to fourth cooling structures, FIG. 12 a variant of the area of the receiving device shown on the right-hand side of FIG. 11 and FIG. 13 schematically a road vehicle and an arrangement for inductively transferring energy to the road vehicle, wherein a receiving device for receiving a magnetic field is integrated at the bottom of the vehicle.
Figure 2:
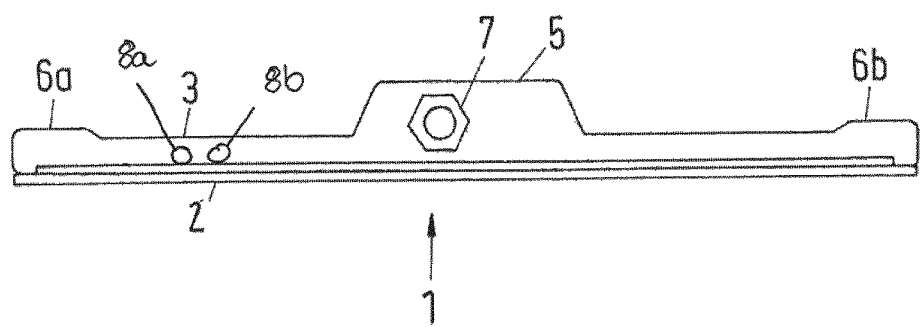

The receiving device 1 shown in FIG. 1 and FIG. 2 comprises a case having a base plate 2 and a top part or cover 3. While the base plate 2 forms a planar surface on the underside (the receiving side of the receiving device to be housed by the case), the top surface formed by the cover 3 is not planar as a whole, but only comprises planar regions. The cover 3 has three elongated protruding portions 5, 6a, 6b which protrude to the top side (the side opposite to the receiving side of the case or receiving device).

In the embodiment shown in FIG. 1 and FIG. 2, the cover 3 forms the main sections of the side surfaces of the case 1. In alternative embodiments, the case may have a planar upper part, may comprise more than two parts forming the outer surfaces and/or larger parts of the side surfaces may be formed by the base part which corresponds to the base plate 2 in FIG. 1 and FIG. 2.

The side surfaces of the case at the face side comprise a cooling fluid inlet opening 8a and a cooling fluid outlet opening 8b.

According to the specific embodiment shown in FIG. 1 and FIG. 2, the protruding portions 5, 6a, 6b of the cover 3 are elongated, i.e. in each case comprise a longitudinal axis along which they extend. The central protruding portion 5 has an opening in the side face shown in FIG. 2 which opens to a tubular connecting part 7 that can be used for receiving electric connection lines or cables in order to electrically connect the capacitors and the electric lines of the at least one coil.

Variations of the embodiment shown in FIG. 1 and FIG. 2 are possible, such as a case having no protruding portion at the top.

Figure 3:
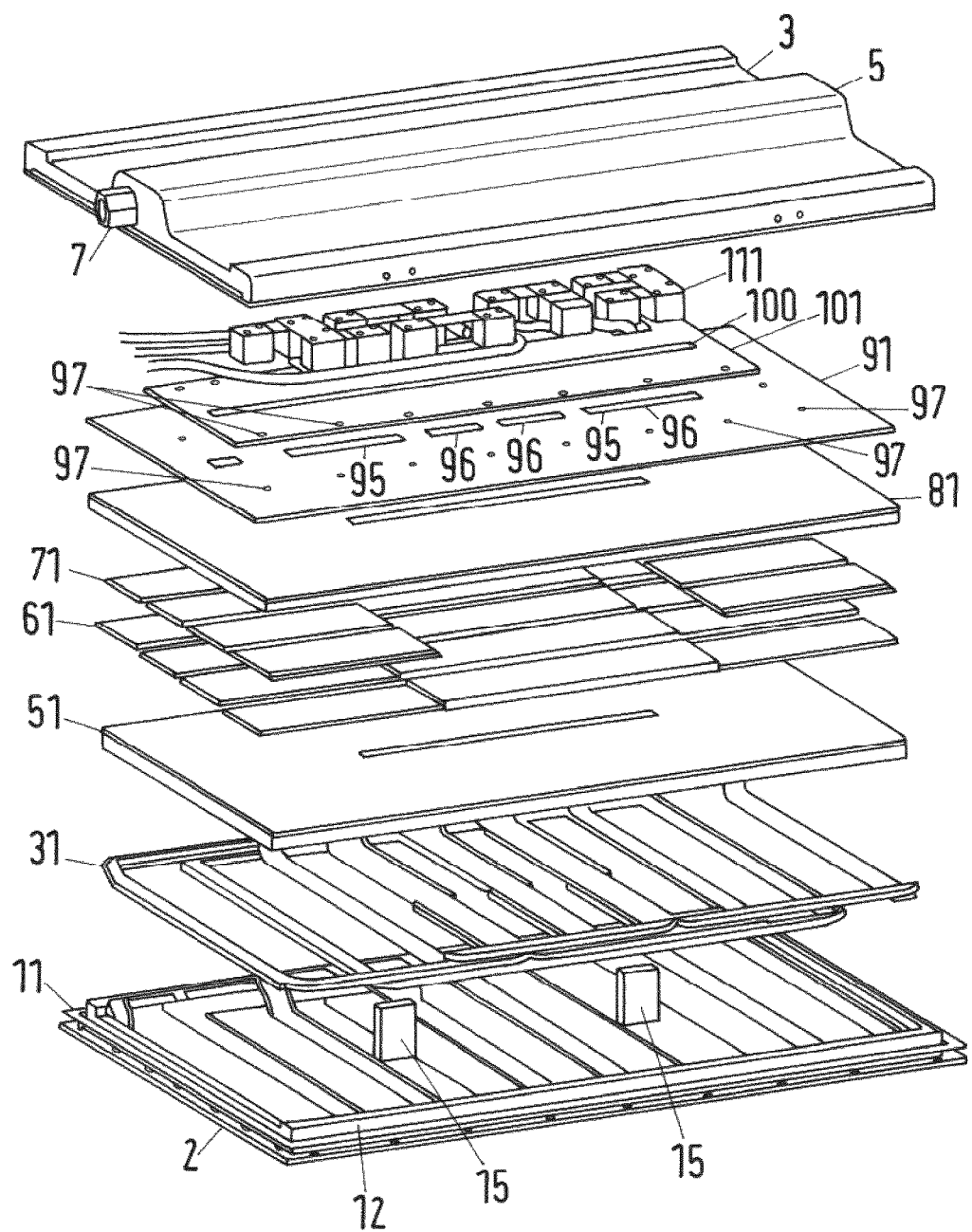

The exploded view of FIG. 3 shows a specific embodiment of a receiving device, wherein the components of the receiving device are housed by the case shown in FIG. 1 and FIG. 2.

The base part 2 of the case carries a holding device 12 for holding other interior components of the receiving device, in particular electric lines that form in each case two coils of three phases. In addition, the holding device 12 comprises a plurality of columns for separating, holding and/or fixing components of the receiving device which are located above the coils. When the cover 3 of the case is mounted to the base plate 2 of the case, the outer rim of the cover 3 abuts on a sealing 11 which is positioned in the periphery of the holding device 12 and is supported by the rim of the base plate 2.

A coil arrangement 31 is positioned within pre-defined receiving spaces of the holding device 12. Since the different electric lines (phase lines) for producing the different phases of an alternating current form coils which overlap each other if viewed from the top (from the cover 3), the phase lines of at least two of the phases rise nearby the longitudinal sides of the coil arrangement so that they extend along the longitudinal side one upon the other, where they overlap.

Figure 4:
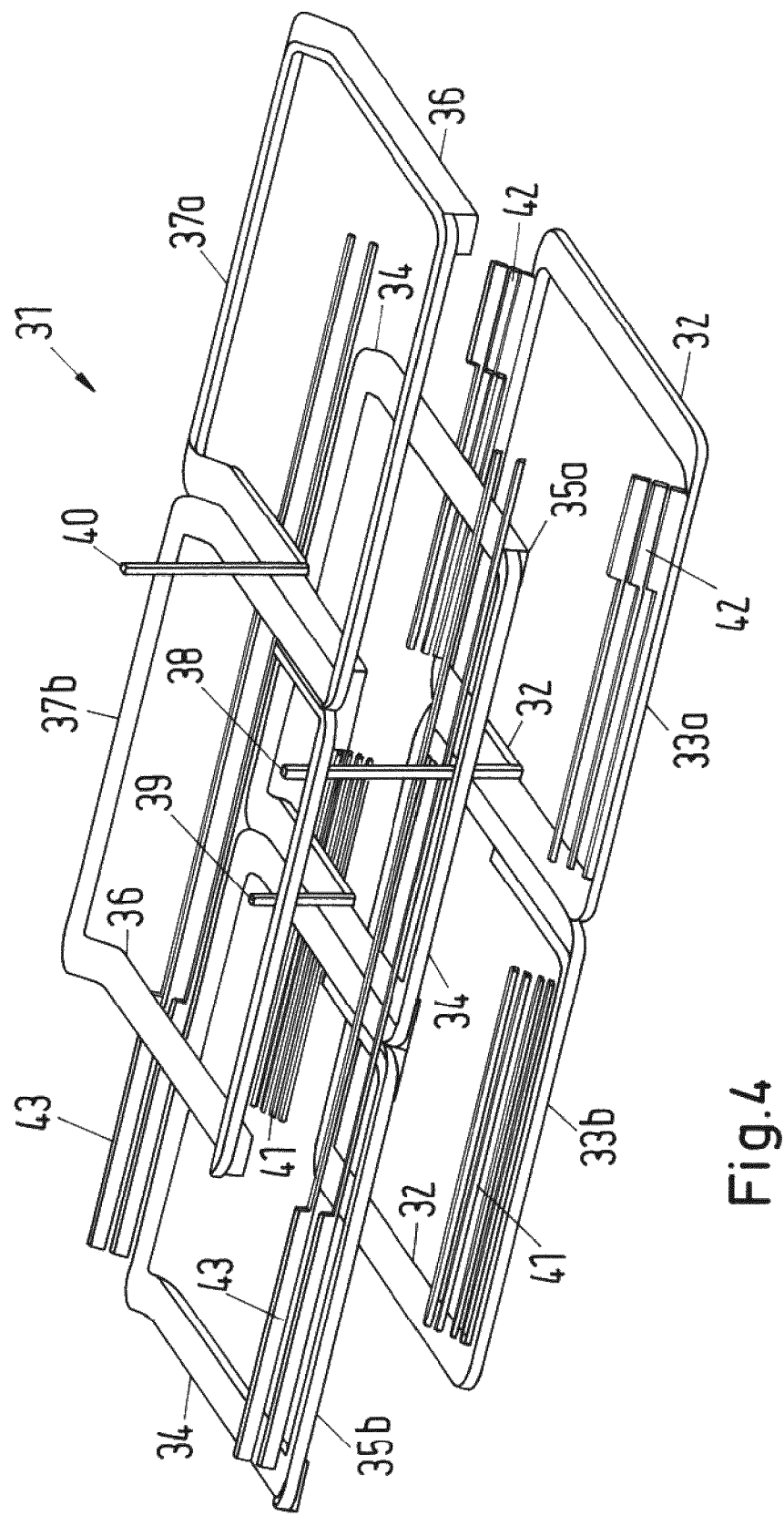

These regions are possible hotspots. Details of a specific embodiment of this kind are shown in FIG. 4 and will be described later.

An arrangement 61, 71 of magnetizable material, in particular ferrimagnetic material or alternatively ferromagnetic material, is placed above the coils. Tiles 61 of the magnetizable material may be stacked upon each other. The height of the magnetizable material may differ and may be larger above (i.e. behind) regions where the density (number per length) of the electric lines of the coil arrangement 31 is higher. In this case, compensating material 71 may be placed where the height of the magnetic material is smaller so that the height of the total arrangement of magnetic material and compensating material 71 is constant or, at least, varies less than the height of the magnetizable material.

A first cooling structure 81 is arranged in between the arrangement of magnetizable material and the capacitor arrangement 111, which is placed behind (above in the embodiment shown) magnetizable material.

As an optional feature, a second cooling structure 51 is arranged in between the arrangement of magnetizable material and the coils. This second cooling structure 51 is made of electrically non-conductive and non-magnetizable material.

An insulation layer 91 made of electrically insulating material may optionally be placed on top of the first cooling structure 81. The insulation layer 91 has cutouts 95, 96 so that columns of the holding device 12 and electrical connections 38, 39, 40 (see FIG. 4) can extend through the cutouts 95, 96.

The capacitor arrangement 111 is placed on a sheet-like carrier 101, such as a conventional circuit board. There is a cutout 100 in the carrier 101 so that the electric connections 38, 39, 40 between the capacitor arrangement 111 and the coil arrangement 31 can extend through the cutout 100. In particular, the capacitor arrangement 111 can be fixed to the carrier 101, for example by gluing, and the holding device 12 can be fixed to the base plate 2 of the case, such as by gluing or screwing. Preferably, screws are also used to fix the carrier 101 to the columns of the holding device 12.

A preferred embodiment of the coil arrangement 31 is shown in FIG. 4. The coil arrangement consists of six coils 33a, 33b, 35a, 35b, 37a, 37b, two coils per phase line 32, 34, 36 of the three phases. The coils of each phase line are placed next to each other on the same height level of the receiving device. FIG. 4 shows an exploded view of the coil arrangement 31.

To form the two coils of one phase, the respective phase line 32, 34, 36 is wound starting at one end of a first coil around the area to be covered so as to form the first coil and further extends around the area to be covered by the second coils so as to form the second coil. In the example shown in FIG. 4, each coil may comprise two to five windings. The number of the windings of the phase lines 32, 34, 36 is not shown in the figures.

The coils of the different phases overlap each other partially in the middle region of the coil arrangement 31. The phase lines 32, 34, 36 are placed one upon the other where the coils overlap. Since transversally extending sections of the different phase lines 32, 34, 36, which sections connect the longitudinal sides, are placed on the same height level in the finished coil arrangement 31, at least the phase lines 34, 36 rise along their extension next to the longitudinal sides of the coils. The holding device 12 defines spaces for receiving these transversely extending sections of the phase lines, wherein the spaces are on the same height level.

Although the phase lines 32, 34, 36 are preferably electrically insulated at their surfaces, the coils 33, 35, 37 of the different phases can be placed upon each other using distance pieces 41, 42, 43. These pieces are placed in between the phase lines 32, 34, 36 where they are placed one upon the other. Preferably, the distance pieces are made of material having a high heat conduction coefficient, for example in the order of the heat conduction coefficient of metal.

The longitudinal section of the coil 33b of the first phase is fully overlapped by the coils 35a, 35b of the second phase. If the coils 35a, 35b are placed on top of the coils 33a, 33b, the transversely extending section at the side face of coil 35b is placed outside of the area which is covered by the second coil 33b of the first phase. The transversely extending section of the second phase which comprises sections of the first coil 35a and the second coil 35b is placed in the area around which the phase line 32 of the second coil 33b of the first phase extends. The transversely extending section of the first coil 35a of the second phase is placed in the area around which the phase line 32 of the first coil 33a of the first phase extends. The corresponding arrangement can be perceived from FIG. 3: the transversely extending sections of the coils are separated from and distanced to the neighboring transversely extending section of another coil. In the middle region, there are two separating columns 15 for mechanically connecting the interior parts of the receiving device to each other. Each column 15 is located in between two neighboring transversely extending sections.

The coils 35 of the second phase and the coils 37 of the third phase are shifted in a similar manner relative to each other as the first phase and the second phase, but the shift length in longitudinal direction is twice as large as the shift length of the first and second phase. As a result, the transversely extending section at the side face of the first coil 37a of the third phase is placed outside of the area around which the phase line 32 of the first coil 33a of the first phase extends. On the other hand, the shift length in longitudinal direction of the third phase relative to the first phase has the same amount as the shift length of the first phase and the second phase, but is oriented in the opposite direction if viewed from the first phase coil arrangement.

At least one end of the phase line 32, 34, 36 which forms the coils of the respective phase is connected to a line section or forms a line section that extends upwards from the coils. Respective upwardly extending sections 38, 39, 40 are shown in FIG. 4. The other ends of the phase lines 32, 34, 36 can directly be connected to each other (not shown in FIG. 4) so as to form an electrical star point. Since at least one end of each phase line 32, 34, 36 is connected to an upwardly extending section 38, 39, 40, the coil arrangement can be electrically connected to the capacitor arrangement 111 located behind the magnetizable material and behind at least the cooling structure 81. In particular, the upwardly extending sections 38, 39, 40 are connected to in each case at least one capacitor of the capacitor arrangement 111 shown in FIG. 3.

Figure 5:
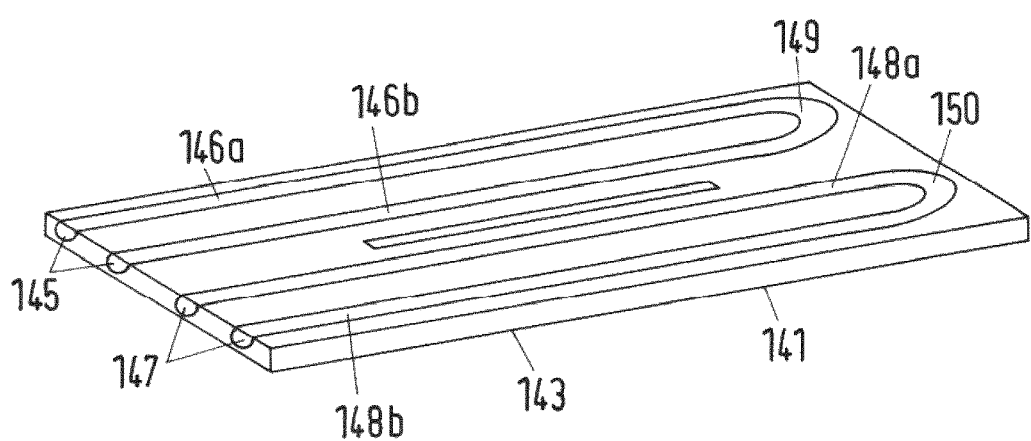

The cooling structure 141 which is schematically shown in FIG. 5 may be the first cooling structure 81 or the second cooling structure 51 shown in FIG. 3. A single plate 143 defines channels for a plurality of conduits 145, 146 which are embedded in the plate 143. In particular, the plate 143 may comprise grooves for the conduits 145, 147. The plurality of conduits 145, 147 may hydraulically be connected in parallel to each other. This means that the forward sections 146a, 148a of the conduits 145, 147 are connected to the same cooling fluid inlet (not shown in FIG. 5). The return sections 146b, 148b of the conduits 145, 147 are connected to the same fluid outlet (not shown). In practice, each plate shaped cooling structure may comprise more conduits as shown in FIG. 5. The forward and return sections of the conduits are connected by curved sections 149, 150 so that the cooling fluid which flows through the forward section is redirected and enters the return section. Depending on the location of the cooling structure within the receiving device and, therefore, depending on the presence of a magnetic field for transferring energy to the receiving device, the material of the plate 143 may be either a metal or ceramic. As an alternative to a ceramic material, another electrically non-conductive and non-magnetizable material can be used.

Figure 6:
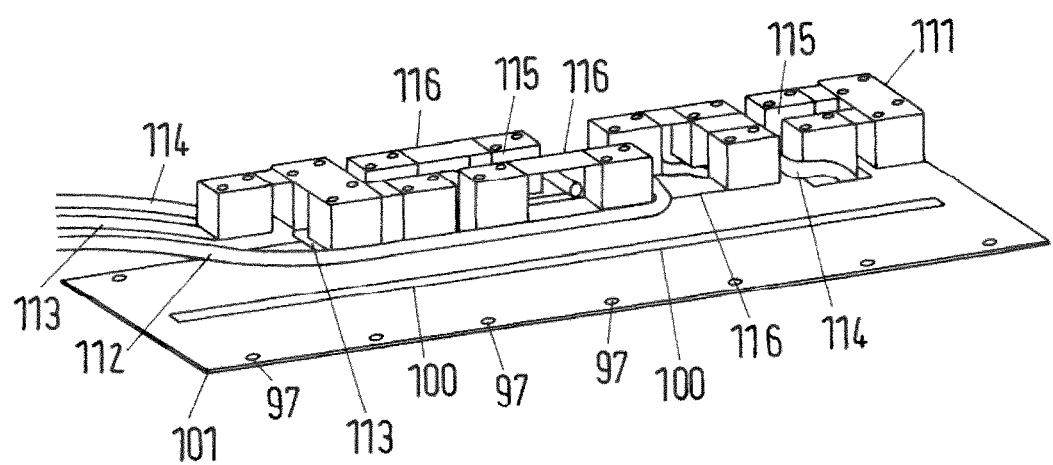

FIG. 6 shows an enlarged view of the capacitor arrangement 111. There is a plurality of block-shaped capacitors 115, some of which are electrically connected to each other by plate-like electrical connectors 116. The capacitors 115 are carried by and preferably fixed on the carrier 101. In addition, the capacitors 115 are electrically connected to the respective coil in particular via the upwardly extending connecting sections 38, 39, 40 shown in FIG. 4 and are electrically connected via connection lines 112, 113, 114 to an external device, in particular to a rectifier for rectifying alternating currents produced by the receiving device. These external connection lines 112, 113, 114 can be guided through the connecting part 7 shown in FIG. 1 and FIG. 2.

Figure 7:
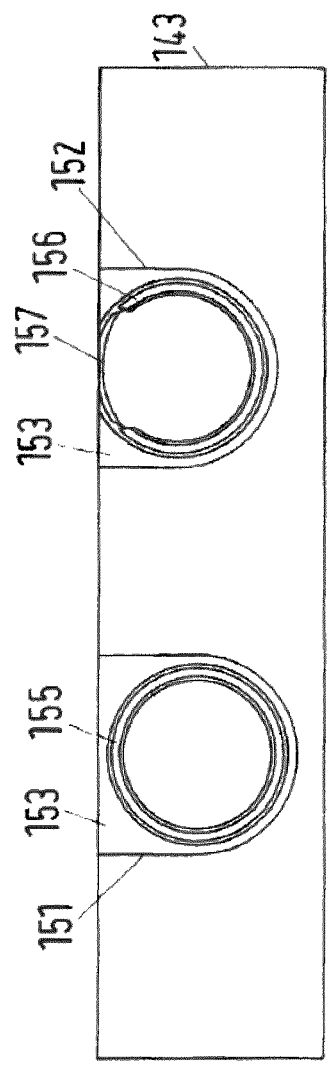

FIG. 7 shows a cross section through a region of a plate, which may be the plate 143 of FIG. 5. The region has two grooves 151, 152 in which in each case one conduit, namely a tube 155, 156 is embedded. Gaps in between the groove 151, 152 and the tube 155, 156 are filled by a filler material 153. In case of the tube 155, the filler material 153 completely encloses the tube 155 and also forms the surface of the cooling structure. The tube 156 is a variant of the tube 155. It has a flattened wall section 157 which forms the surface of the cooling structure. The other wall sections of the tube 156 are circular. The flattened wall section improves the heat transfer from arrangements contacting the cooling structure via the flattened wall section 157 to the cooling fluid inside the tube 156. In practice, it is preferred that all conduits of the same cooling structure either have the configuration of the tube 155 or the configuration of the tube 156.

Figure 8:
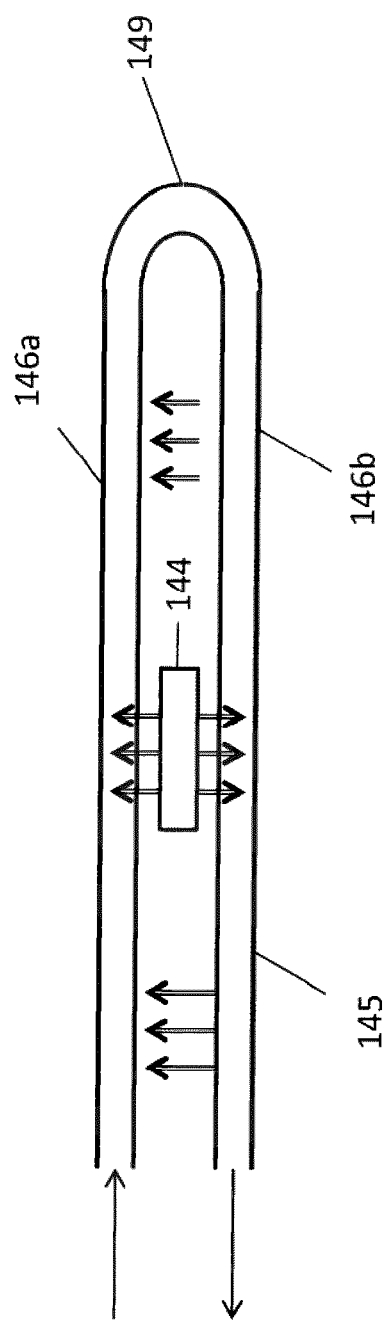

FIG. 8 shows a single conduit, which may be the conduit 145 of FIG. 5. During operation of the cooling structure, heat is transferred to the cooling fluid flowing through the forward section 146a so that the temperature of the cooling fluid increases in the course of the stream. Therefore, the temperature of the cooling fluid flowing through the return section 146b is higher than the temperature of the cooling fluid flowing through the forward section 146a. As a result and since the forward and return sections are placed side-by-side, heat is transferred from the cooling fluid in the return section 146b to the cooling fluid in the forward section 146a. As indicated by the lengths of arrows nearby the fluid inlet and outlet (on the left-hand side in FIG. 8) and nearby the curved section 149 connecting the forward and return sections, the heat transfer nearby the fluid inlet and outlet is greater than the heat transfer nearby the curved section 149. The reason is the higher temperature difference nearby the fluid inlet and outlet.

In the middle region of the forward and return section and in between the forward and return section, there is a hotspot 144 having a higher temperature than other regions of the receiving device and having a higher temperature than the cooling fluid in any section of the conduit 145. Consequently, heat is transferred from the hotspot 144 to the forward section 146a and to the return section 146b.

FIG. 9 shows a three-dimensional view of a first cooling structure 181 which is to be located between magnetisable material and a capacitor arrangement of a receiving device. Therefore, the cooling structure 181 may comprise a plate 143 made of electrically conducting material in which conduits are embedded. In particular, the first cooling structure 81 of FIG. 3 may be replaced by the first cooling structure 181 of FIG. 9.

A combined fluid inlet and outlet unit 161 is attached to the plate 143. Its fluid inlet connection 162 branches off within the unit 161 into a plurality of fluid inlet conduits 100a connected in each case to one of the forward sections of the fluid conduits within the plate 143. The return sections which are also embedded in the plate 143 are connected to in each case one outlet conduit of the unit 161 and are reunited by a collector of the unit which connects the plurality of outlet conduits to the fluid outlet connection 163 of the unit 161. Since the unit 161 provides for mechanical contact between the fluid inlet conduits and the fluid outlet conduits, heat will be transferred from the outlet conduits to the inlet conduits and the effect described above in connection with FIG. 8 is enhanced, namely the temperature of the cooling fluid in the outlet is reduced and temperature differences within the cooling structure or cooling structures are reduced.

The forward and return sections embedded in the first cooling structure 181 extend from the side of the unit 161 to the opposite side of the plate 143. Some of the forward sections and return sections are connected on this opposite side by a connecting tube arrangement 166a, 166b to a third cooling structure which has two separate elements 165a, 165b. Each of the elements 165 is to be placed next to a lateral end region of the at least one coil of the receiving device. Each element 165 has a plate 167a, 167b in which at least one forward section and at least one return section of the cooling fluid conduits is embedded. The connecting tube arrangement 166a, 166b connects each of the forward sections of the elements 165 to one forward section of the first cooling structure 181 and connects each return section of the elements 165 to one return section of the first cooling structure 181. Therefore, cooling fluid flows from the fluid inlet connection 162 through at least some of the forward sections within the first cooling structure 181 via the connecting tube arrangements 166 into the forward sections of the third cooling structure and is redirected by redirecting sections 169a, 169b into the return sections of the third cooling structure. Having passed through the return sections of the third cooling structure, the cooling fluid flows back through the connecting tube arrangement 166 into return sections of the first cooling structure 181 and is collected by the collector of the unit 161.

Optionally, as shown in FIG. 9 and FIG. 10, the third cooling structure may comprise additional cooling fluid conduits 170, 171 which are not embedded in a plate of the third cooling structure. These additional conduits 170, 171 may be conduits of a fourth cooling structure and may be embedded in a plate in between the lateral end regions of the at least one coil and magnetisable material for shielding the environment from magnetic fields in the region of the lateral ends of the at least one coil.

Figure 11:
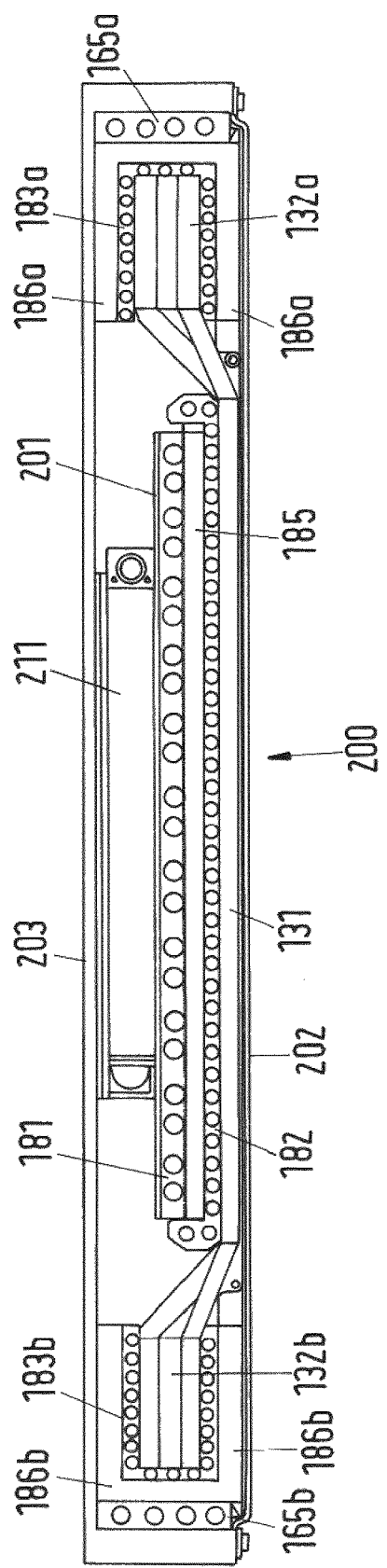

FIG. 11 shows a second embodiment of a receiver 200 having internal cooling structures. During operation, electromagnetic fields are received from below. Consequently, the receiving side is located at the bottom where the bottom part 202 of the housing is located. A plurality of coils 131 forming a plurality of phase lines (three phase lines in the example shown) extend with their central and lateral connecting section, which correspond to the transversely extending line sections mentioned above, close to the bottom part 202 of the housing. During operation, an electric voltage is induced by magnetic induction in these coils 131.

Since there is a plurality of phase lines, the coils 131 form lateral end sections 132a, 132b on opposite sides of the receiving device 200. These lateral end sections 132 are enclosed on three sides by in each case one (second) field shaping arrangement 186a, 186b made of magnetisable material in the shape of a C-profile.

The central connecting region of the coils 131 is also covered by a (first) field shaping arrangement 185 made of magnetisable material which almost completely covers the central region of the coils 131. The magnetisable material is located within a region behind the central region of the coils 131, if viewed from the receiving side.

Behind the first field shaping arrangement 185, a capacitor arrangement 211 is placed, the capacitors of which are electrically connected to the coils 131. The capacitor arrangement 211 may be carried by and/or may be in mechanical contact with a carrier plate 201 which is preferably made of high heat conducting material such as aluminium.

In order to cool the receiving device 200 during operation, it comprises four cooling structures 165, 181, 182, 183 having, in each case, a plurality of conduits embedded in a carrier material. The first cooling structure 181 is located in between the first field shaping arrangement 185 and the capacitor arrangement 211. The first cooling structure 181 is made of electrically conducting material and improves the field shaping function provided by the first field shaping arrangement 185. The first cooling structure 181 comprises a plate in which the cooling fluid conduits are embedded. The plate extends in between the first field shaping arrangement 185 and the capacitor arrangement 211. On the bottom side, the whole surface of the plate is in contact with the surface on the top side of the first field shaping arrangement 185. On the top side of the plate, the bottom surface of the capacitor arrangement 211, which bottom surface is for example formed by the carrier plate 201, is continuously and completely in mechanical contact with the top surface of the first cooling structure 181. The top surface of the capacitor arrangement 211 is preferably in full mechanical contact with the upper part 203 of the housing.

A second cooling structure 182 made of electrically non-conducting and non-magnetisable material is placed in between the central region of the coils 131 and the bottom surface of the first field shaping arrangement 185. Optionally, as shown in FIG. 11, opposite side regions of the second cooling structure 182 may be in mechanical contact with the lateral side surfaces of the first field shaping arrangement 185. In this case, the second cooling structure 182 has the profile of a trough.

A third cooling structure comprising two separate elements 165a, 165b on opposite sides of the housing interior of the receiving device is provided for cooling the C-profiled second field shaping arrangements 186a, 186b. The elements 165a, 165b of the third cooling structure and the first cooling structure 181 may be arranged in the manner shown in FIG. 9. Preferably, the conduits and connecting tube arrangements are formed in the same manner as shown in FIG. 9 and FIG. 10.

Figure 12:
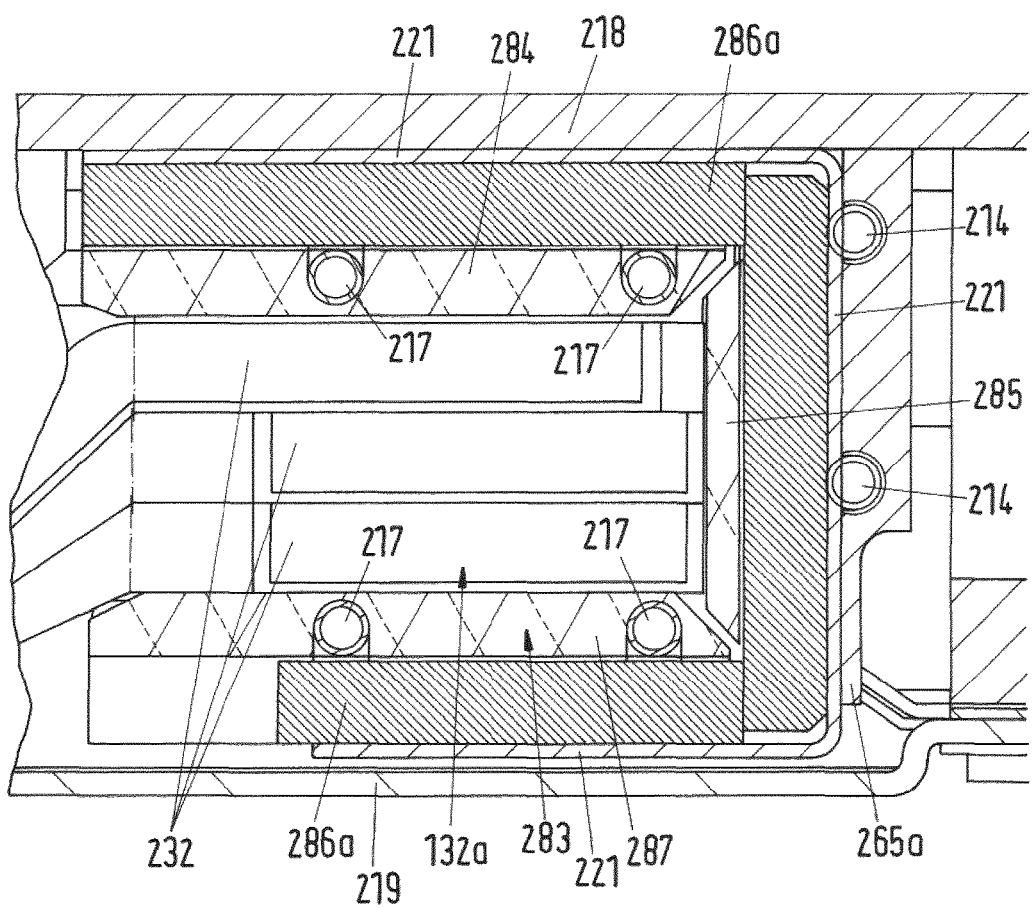

The surfaces on the interior side of the elements 165a, 165b are in full contact with the outer surface of the C-profiled second field shaping arrangement 186a, 186b, optionally via a layer of heat conducting material, such as aluminium (see special embodiment shown in FIG. 12).

A fourth cooling structure 183a, 183b also having a C-profile in the cross section shown is provided in between the lateral end sections 132a, 132b of the coils 131 and the second field shaping arrangement 186a, 186b. It is in full mechanical contact on its outer sides with the second field shaping arrangement 186a, 186b. FIG. 12 shows a variant with a different fourth cooling structure.

Alterations of the embodiment shown in FIG. 11 are possible. For example, the second field shaping arrangement and/or the fourth cooling structure may surround the respective lateral end section of the coils on one or two sides only, although this is not preferred. For example, the second field shaping arrangement and the fourth cooling structure are L-profiled, thereby extending on the lateral outer side and on the top side of the respective lateral end section. In addition or alternatively, the second cooling structure and/or the fourth cooling structure can be omitted. Furthermore, it is possible to arrange the third cooling structure on the outside of the second field shaping arrangement not only on the lateral side, but also on the top side and/or the bottom side. In this case, the respective element of the third cooling structure may be L-shaped or C-shaped.

FIG. 12 shows the lateral end section 132a of the coils on the right hand side of FIG. 11, but with a variant of the cooling configuration. The three rectangular areas denoted by reference numeral 232 schematically indicate the regions where the electric lines for carrying the different phases of the three-phase alternating current can cross each other if viewed from the top or bottom. Similarly to FIG. 11, the lateral end section 132a is embedded in a C-profiled field shaping arrangement 286a, e.g. made of ferrite. It may consist of different parts, wherein each part having the form of a slab is positioned on one side of the lateral end section 132a. On the inner side of the field shaping arrangement 286a, towards the lateral end section 132a of the coils, a fourth cooling structure 283 is placed. It is made of electrically insulating material and comprises three parts 284, 285, 287. A first part 284 is placed at the top of the lateral end section 132a, and comprises a cooling plate with interior conduits 217. A second part 285 is placed on the outer lateral side of the lateral end section 312a and comprises a cooling plate having no interior conduits for guiding cooling fluid in order to save space. Alternatively, it may comprise interior cooling conduits. A third part 287 is placed at the bottom of the lateral end section 132a, and comprises a cooling plate with interior conduits 217.

On its outer side, the field shaping arrangement 286a is embraced by a C-profiled layer 221 of electrically conducting heat conducting material, in particular metal, preferably aluminum. It is an additional shield for shielding the exterior from the electromagnetic field in the region of the lateral end section 132a. Furthermore, it provides for thermal contact between the field shaping arrangement 286a and a housing cover 218 which is preferably also made of heat conducting material, in particular metal, preferably aluminum. It also provides for thermal contact between the field shaping arrangement 286a and a third cooling structure 265a, comprising a plate with interior fluid conducting conduits 214. The third cooling structure 265a may be made of aluminum.

The receiving side at the bottom of the housing is covered by an electrically insulating bottom cover 219.

Figure 13:
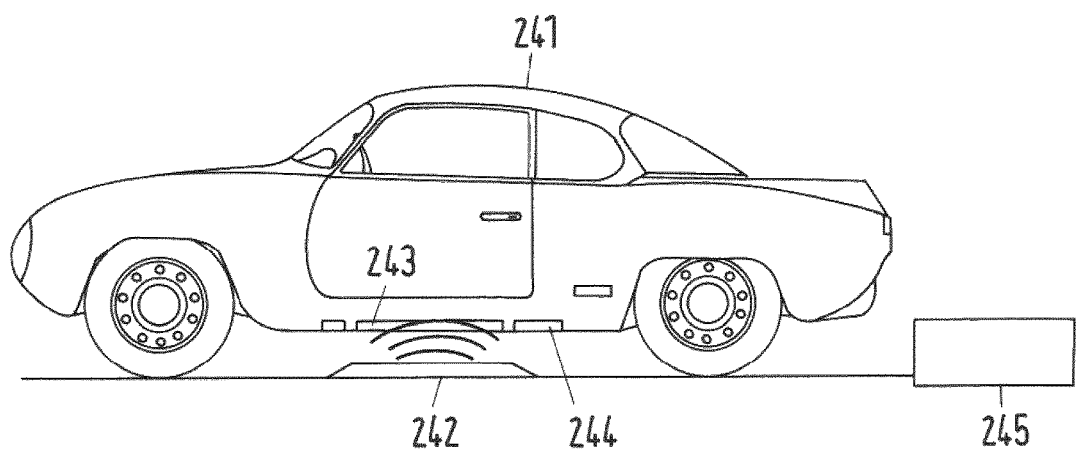

FIG. 13 shows a road vehicle 241 having the receiving device. Its location at the vehicle's bottom is schematically indicated by a block with reference numeral 243. A rectifier is schematically indicated by another block with reference numeral 244. In particular, the receiving device may be placed in a corresponding recesses formed by the bottom surface of the car body of a road vehicle 241. During wireless energy transfer to the vehicle 241, a generating device 242 on the surface of the road or parking place generates the magnetic field, in particular by generating an alternating electromagnetic field. The magnetic field is indicated by three curved lines. The generating device 242 is provided with electric current from corresponding equipment 245, which may include an inverter and/or an AC/AC converter.

The invention claimed is:

1. A receiving device for receiving a magnetic field and for producing electric energy by magnetic induction, for use by a vehicle, wherein
   the receiving device comprises at least one coil of at least one electric line and wherein the magnetic field induces an electric voltage in the at least one coil during operation,
   the receiving device and the at least one coil are adapted to receive the magnetic field from a receiving side of the receiving device,
   the receiving device comprises a first field shaping arrangement comprising magnetizable material adapted to shape magnetic field lines of the magnetic field,
   the first field shaping arrangement is placed behind the at least one coil, when viewed from the receiving side of the receiving device,
   the receiving device comprises a capacitor arrangement comprising at least one capacitor, which is electrically connected to the at least one coil,
   the capacitor arrangement is placed behind the first field shaping arrangement, when viewed from the receiving side of the receiving device,
   the receiving device comprises a first cooling structure comprising conduits for guiding a flow of a cooling fluid in order to cool the receiving device,
   the first cooling structure is placed in between the first field shaping arrangement and the capacitor arrangement.

2. The receiving device of claim 1, wherein the receiving device comprises a second cooling structure comprising conduits for guiding a flow of a cooling fluid in order to cool the receiving device and wherein the second cooling structure is placed in between the at least one coil and the first field shaping arrangement.

3. The receiving device of claim 2, wherein the second cooling structure comprises a plate of electrically non-conductive, non-magnetic and non-magnetizable material which contains the conduits.

4. The receiving device of claim 1, wherein the at least one coil comprises lateral end regions on opposite sides of the at least one coil, wherein the lateral end regions are connected by electric lines of the at least one coil extending in a central region in between the lateral end regions, wherein the lateral end regions are surrounded on at least two sides of the lateral end regions, including a lateral outer side of the lateral end region, by in each case one second field shaping arrangement comprising magnetizable material adapted to shape magnetic field lines of the magnetic field, wherein a third cooling structure comprising conduits for guiding a flow of a cooling fluid in order to cool the receiving device is placed in each case on the lateral outer side of the lateral end region.

5. The receiving device of claim 4, wherein a fourth cooling structure comprising conduits for guiding a flow of a cooling fluid in order to cool the receiving device is placed in each case in between the second field shaping arrangement and the lateral end region of the at least one coil.

6. The receiving device of claim 5, wherein the fourth cooling structure comprises a plate of electrically non-conductive non-magnetic and non-magnetizable material which contains the conduits.

7. The receiving device of claim 1, wherein the first cooling structure fully covers the first field shaping arrangement.

8. The receiving device of claim 1, wherein the first cooling structure comprises a plate of electrically conductive material which contains the conduits.

9. The receiving device of claim 1, wherein the first cooling structure is connected to a fluid inlet which branches off into a plurality of conduits in the first cooling structure, and wherein the first cooling structure is connected to a fluid outlet which reunites the flow of cooling fluid within the plurality of conduits.

10. The receiving device of claim 1, wherein at least one conduit of the first cooling structure comprises a forward section for guiding incoming cooling fluid from a fluid inlet and a return section for guiding cooling fluid from the forward section to a fluid outlet, wherein the forward section and the return section extend side-by-side to each other and are mechanically connected to each other by a supporting material of the first cooling structure for supporting the at least one conduit.

11. A method of manufacturing a receiving device for receiving a magnetic field and for producing electric energy by magnetic induction, for use by a vehicle, comprising the steps of
   providing at least one coil of at least one electric line, wherein the magnetic field induces an electric voltage in the at least one coil during operation and wherein the receiving device and the at least one coil are adapted to receive the magnetic field from a receiving side of the receiving device,
   providing a first field shaping arrangement comprising magnetizable material adapted to shape magnetic field lines of the magnetic field,
   placing the first field shaping arrangement behind the at least one coil, when viewed from the receiving side of the receiving device,
   providing a capacitor arrangement comprising at least one capacitor, which is electrically connected to the at least one coil,
   placing the capacitor arrangement behind the first field shaping arrangement, when viewed from the receiving side of the receiving device,
   providing a first cooling structure comprising conduits for guiding a flow of a cooling fluid in order to cool the receiving device,
   placing the first cooling structure in between the first field shaping arrangement and the capacitor arrangement.

12. The method of claim 11, wherein a second cooling structure is provided comprising conduits for guiding a flow of a cooling fluid in order to cool the receiving device and wherein the second cooling structure is placed in between the at least one coil and the first field shaping arrangement.

13. The method of claim 12, wherein the second cooling structure comprises a plate of electrically non-conductive, non-magnetic and non-magnetizable material which contains the conduits.

14. The method of claim 11, wherein the at least one coil comprises lateral end regions on opposite sides of the at least one coil, wherein the lateral end regions are connected by electric lines of the at least one coil extending in a central region in between the lateral end regions, wherein the lateral end regions are surrounded on at least two sides of the lateral end regions, including a lateral outer side of the lateral end region, by in each case one second field shaping arrangement comprising magnetizable material adapted to shape magnetic field lines of the magnetic field, wherein a third cooling structure comprising conduits for guiding a flow of a cooling fluid in order to cool the receiving device is placed in each case on the lateral outer side of the lateral end region.

15. The method of claim 14, wherein a fourth cooling structure comprising conduits for guiding a flow of a cooling fluid in order to cool the receiving device is placed in each case in between the second field shaping arrangement and the lateral end region of the at least one coil.

16. The method of claim 15, wherein the fourth cooling structure comprises a plate of electrically non-conductive, non-magnetic and non-magnetizable material which contains the conduits.

17. The method of claim 11, wherein the first field shaping arrangement is fully covered by the first cooling structure.

18. The method of claim 11, wherein the first cooling structure is connected to a fluid inlet such, that the fluid inlet branches off into a plurality of conduits in the first cooling structure, and wherein the first cooling structure is connected to a fluid outlet which reunites the flow of cooling fluid within the plurality of conduits.

19. The method of claim 11, wherein at least one conduit of the first cooling structure is provided with a forward section for guiding incoming cooling fluid from a fluid inlet and a return section for guiding cooling fluid from the forward section to a fluid outlet, wherein the forward section and the return section are arranged side-by-side to each other and are mechanically connected to each other by a supporting material of the first cooling structure for supporting the at least one conduit.

* * * * *